(12) United States Patent
Muchkaev

(10) Patent No.: US 7,385,511 B2
(45) Date of Patent: Jun. 10, 2008

(54) CARRIERLESS RFID SYSTEM

(75) Inventor: Artem Muchkaev, Glen Waverly (AU)

(73) Assignee: Martec Corporation, Las Vegas, NV (US)

( * ) Notice: Subject to any disclaimer, the term of this patent is extended or adjusted under 35 U.S.C. 154(b) by 286 days.

(21) Appl. No.: 11/407,831

(22) Filed: Apr. 20, 2006

(65) Prior Publication Data

US 2007/0247311 A1 Oct. 25, 2007

(51) Int. Cl.
*G08B 13/14* (2006.01)

(52) U.S. Cl. .............................. 340/572.4; 349/572.1; 349/539.3

(58) Field of Classification Search .............. 340/572.1, 340/572.4, 572.7, 539.1, 539.11, 539.3, 10.1, 340/10.41; 342/42, 44, 47; 235/381; 700/232, 700/237
See application file for complete search history.

(56) References Cited

U.S. PATENT DOCUMENTS

| | | | |
|---|---|---|---|
| 3,969,725 A * | 7/1976 | Couvillon et al. ............ 342/47 |
| 4,475,481 A * | 10/1984 | Carroll ..................... 119/51.02 |
| 5,270,717 A * | 12/1993 | Schuermann ................. 342/22 |
| 5,479,171 A * | 12/1995 | Schuermann ............ 340/10.41 |
| 5,793,324 A * | 8/1998 | Aslanidis et al. ............. 342/51 |
| 6,338,008 B1 * | 1/2002 | Kohut et al. ................ 700/237 |
| 6,343,241 B1 * | 1/2002 | Kohut et al. ................ 700/232 |

\* cited by examiner

*Primary Examiner*—Van T. Trieu
(74) *Attorney, Agent, or Firm*—Hogan & Hartson LLP

(57) ABSTRACT

The present invention is a method and an apparatus to use carrierless signals for energizing remote passive or active transponders (tags) and for communication link between a reader and the transponders. The reader's transceiver generates very short high power pulses to transmit them to the transponder which receives and stores the pulse energy in an energy store on the transponder. At the transponder the power pulse signal is compressed by a matched filter and rectified. Information to be transmitted from the reader to the transponder and from the transponder to the reader can be added to the data pulses by means of pulse position modulation, bi-phase modulation or other well-known wide-band modulation techniques. The communication is active as the transponder utilizes stored power for transmission and reception of signals while the transponder can be passive and is powered by the reader's signal energy.

17 Claims, 10 Drawing Sheets

CARRIERLESS RFID SYSTEM

TECHNICAL FIELD

This invention is related to the field of radio frequency identification (RFID), and more particularly to methods for carrierless (impulse) RFID-systems.

BACKGROUND

RFID technology is one of many identification technologies in the automatic data identification industry. RFID market is growing sector of the radio technology industry, which brings together elements from many varied fields such as RF/microwave technology, semiconductor technology, telecommunications, data protection and cryptography, manufacturing technology, IT and many related areas.

Generally speaking a RFID system consists of two components, namely the transponder or tag, which is located on the object to be identified and the interrogator or reader, which may be a read or read/write device.

The heart of the RFID system lies in the transponder that carries information. The transponder responses to a coded RF signal received from the reader. Low cost and small size transponders are of most intense commercial interest. So-called passive transponder does not possess its own voltage supply. It is activated and functions when it is within the interrogation zone of the reader. As a passive transponder does not require a battery the cost of such transponder is usually low. However, a disadvantage of passive transponders is a short range.

The passive RFID transponder derives its energy (using an integrated rectifier) from the RF continuous wave interrogating signal and transmits the data by modulation of reflection cross-section (backscatter modulation).

Using current low power semiconductor technology, transponder chips can be produced with a power consumption of less than 5 µW. An efficiency of an integrated rectifier can be assumed to be 5-15% in UHF/microwave band. Therefore, an average received power of 50 µW is required at the terminal of the tag antenna for operation of the tag chip. In such a case, sufficiently high reader's transmitter power is required for the operation of the transponder chip.

In order to utilize the received power as effectively as possible, power matching should be provided. In case power matching is not provided, only part of the power is available to the rectifier (Schottky detector). Moreover, one should take into account the tag antenna matching losses including the fact that during altering the load (backscatter modulation) tag impedance is always changed. Thus, only a small proportion of incoming power is effective and circuit efficiency of the tag thereby is very low.

To send data from the transponder to the reader the input impedance of the transponder is altered in time with the data to be transmitted by the switching on and off additional impedance in time with the data to be transmitted. As a result, the power reflected by the transponder is modulated in time with the data. This procedure is known as modulated backscatter. Alternating the input impedance of the transponder results in the amplitude and/or phase modulation.

During backscatter the reader has permanently switched the transmitter on. Therefore, the sensitivity of the receiver in the reader is drastically reduced. In fact, for the transponder to be detected, the transponder's signal should be not more than 100 dB below the reader's carrier signal. The signal reflected by the transponder is modulated. In ASK (Amplitude Shift Keying) with a modulation index 100% the two sidebands would each contain 25% of the total reflected power, and in practice respectively less at a lower modulation index. As a result, it is difficult to achieve long operational distance between transponder and reader in passive transponder.

As is evident from what is said above, there are serious draw backs in the currently known systems. Hence, there is a clear need for a RFID system that could have long range of operation, low sensitivity to electromagnetic interference fields, high data security, high data rate, low cost, fast operation, and mobility.

The instant disclosure introduces solutions to the drawback of the currently known systems and provides a carrierless RFID system that possesses long range of operation, low sensitivity to electromagnetic interference fields, high data security, high data rate, low cost, fast operation, and mobility.

SUMMARY OF THE INVENTION

Accordingly, one object of the current invention is to provide a carrierless RFID system with high efficiency during tag energizing by utilizing the available power effectively by a rectifier.

Another object of the current invention is to provide a carrierless RFID system with long-range operation by using active impulse communication instead of backscatter modulation.

A further object of the current invention is to provide a carrierless RFID system with high data rate for communication by using wideband spectrum allowing high data rate communication.

An even further object of the current invention is to provide a carrierless RFID system with high data security level by means of making interception and unintended detection quite difficult due to noise-like property of signals.

Still another object of the current invention is to provide a carrierless RFID system that is resistant to multipath and jamming and has very little interference with existing radio systems due to a large bandwidth allowing very high multipath resolution and huge frequency diversity.

An even further object of the current invention is to provide a carrierless RFID system that is relatively low complexity and low cost. The carrierless system according to this invention has essentially baseband nature of the signal transmission. Therefore there is no need for up-(down) conversion and amplification, a local oscillator and phase tracking loops.

Another object of the current invention is to provide a carrierless RFID system that possesses a high location and tracking performance. The carrierless system according to this invention allows very good timing precision due to large bandwidth.

Other independent features and advantages of the system will become apparent from the following detailed description, taken in conjunction with the drawings illustrating by way of example the principles of the invention.

DETAILED DESCRIPTION OF THE INVENTION

In this disclosure the term 'carrierless' is used to emphasize the difference to the general RFID systems which use a carrier to transfer power to a tag and to communicate. The term 'carrierless RFID' is used here as a synonym for 'impulse RFID' to emphasize the difference to general RFID systems which use a continuous wave signals as opposed to the impulse signals.

The present invention is a method and an apparatus to use carrierless (impulse) signals for energizing remote passive or active transponders (tags) and for a communication link between a reader and the transponders. The reader's transceiver generates very short high power pulses to transmit them to the transponder which receives and stores the pulse energy in an energy store on the transponder. At the transponder the power pulse signal is compressed by a matched filter and rectified. Information to be transmitted from the reader to the transponder and from the transponder to the reader can be added to the data pulses by means of pulse position modulation, bi-phase modulation or other well-known wide-band modulation techniques. The communication is active as the transponder utilizes stored power for transmission and reception of signals without using back-scatter modulation while the transponder can be passive and is powered by the reader's signal energy.

The present invention provides an efficient method for a remote passive transponder (tag) energizing and a carrierless communication technique between a reader and a tag. This invention satisfies the need for RFID system that eliminates known drawbacks of existing continuous wave RFID systems and encapsulates advantages of carrierless approach to energy transportation and communication.

In the invention two types of short pulse sequences are used. One type, coded power pulse sequences, is used for transferring power from the reader to the transponder (tag) and energizing the tag. To carry information, PPM (pulse position modulation) or bi-phase modulation can be applied to second type sequences—coded data pulse sequences. Well-known time-hopping or direct spreading is applied as multiple access techniques.

Figure 1:
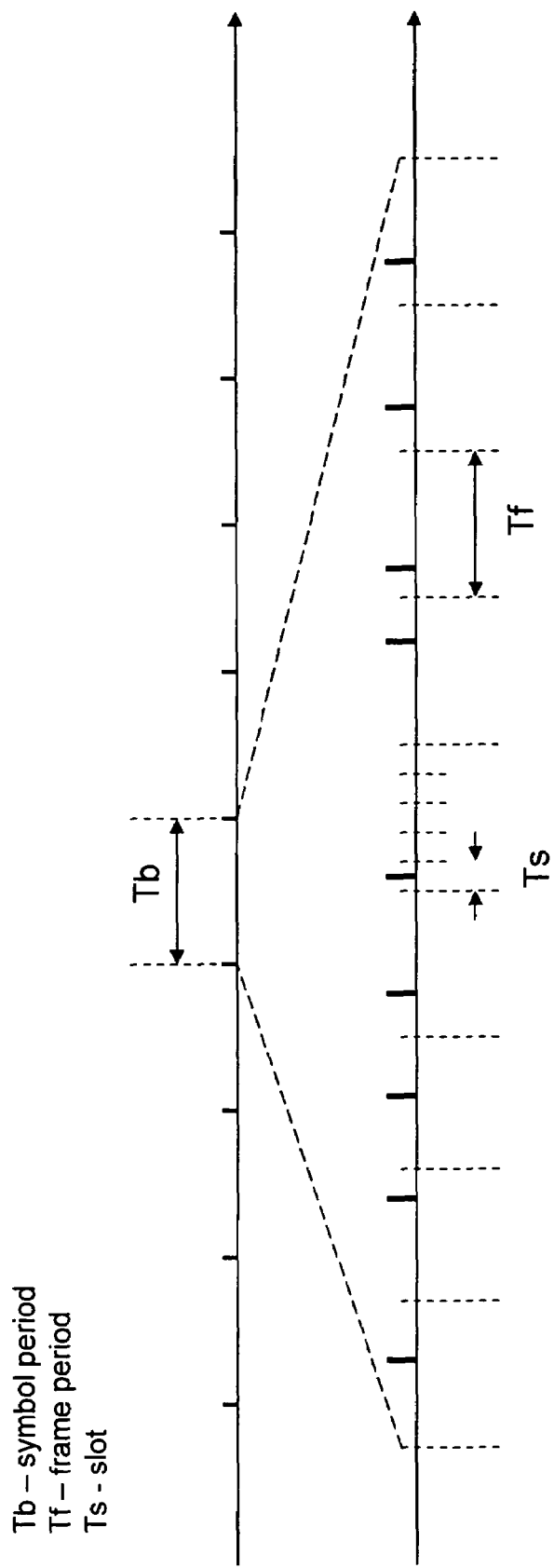
FIG. 1 illustrates time-hopping pulse position modulation (PPM)

According to one embodiment of the invention power pulse sequences are different for each tag or group of tags and each pulse is placed inside a slot of duration Ts which is in its turn positioned inside the frame period Tf as illustrated in FIG. 1. The slot Ts is positioned according to a time-hopping code which is unique to each tag or group of tags. An advantage of having different codes of power pulse sequences (i.e. different power pulse sequences) is that this would facilitate selection of a tag or a group of tags (e.g. each tag in the range of the reader may have the same coded power pulse).

The reader transmits power pulse sequences repeatedly. The power pulses are compressed by matched filter in the tag, rectified by diode detector and stored in an energy store. Only tags that match the coded power pulses shall be energized. The matched filter may be a passive delay line but is not limited to this alternative. According to a preferred embodiment the diode detector is a Schottky detector, but other alternatives may also be used. The energy store typically is a capacitor, but other alternatives such as circuits with capacitors or batteries may also be used.

Figure 2:
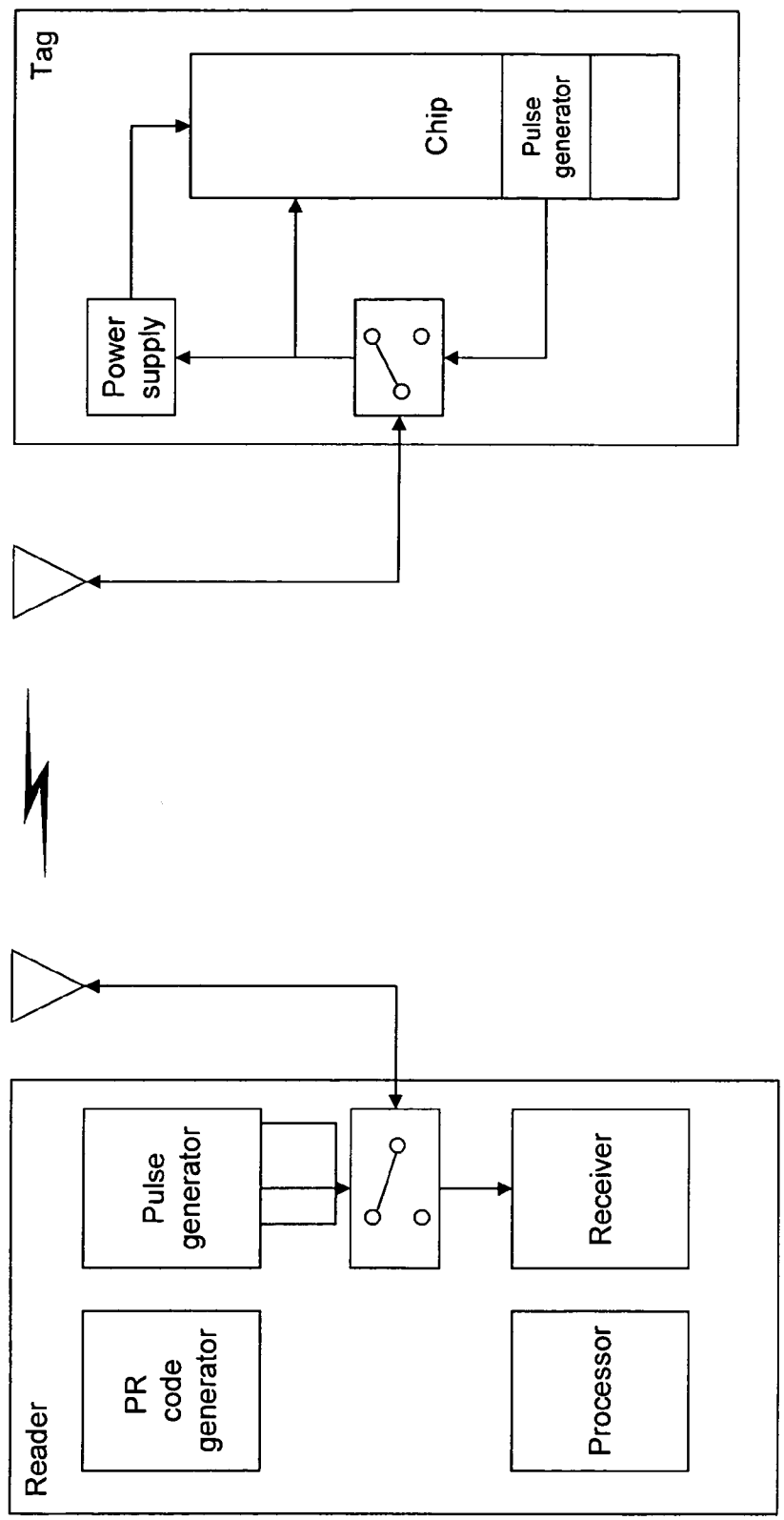
FIG. 2 illustrates a carrierless (impulse) RFID system.

Referring now to FIG. 2, at the reader a power pulse sequence and a data pulse sequence are formed using a PR (pseudo random) code generator and a pulse generator and the sequences are transmitted through a reader antenna to a suitable antenna at a transponder. The transponder antenna introduces the received pulses to a power supply which feeds a chip. Also, the received signals are processed by a detector and a decoder at the chip.

Figure 3A:
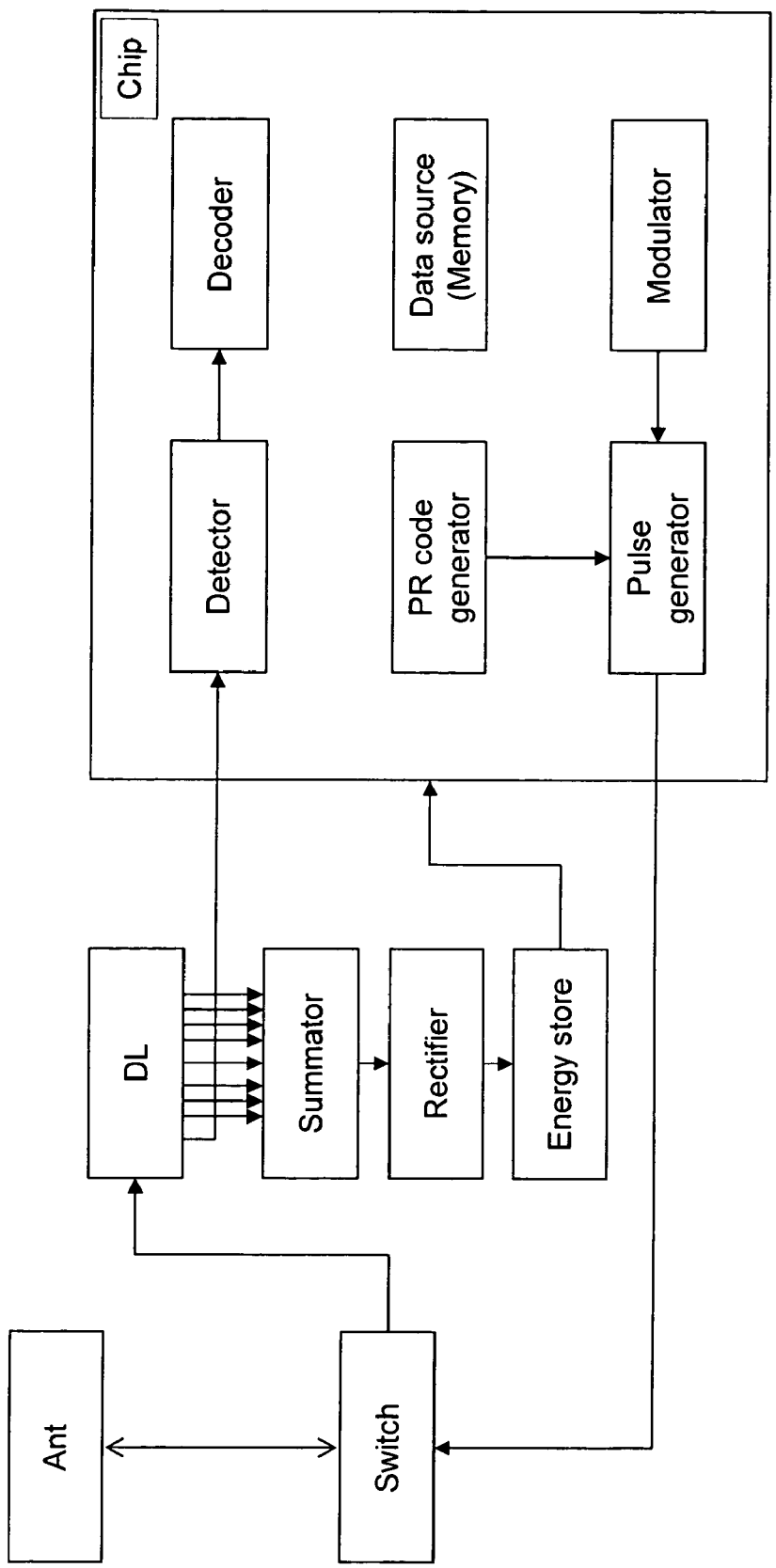
FIG. 3a is a diagram of a carrierless (impulse) RFID tag having one delay line (DL).

Referring now to FIG. 3a, the transponder comprises a data source such as a read only memory, which provides a specific binary sequence as an identifier (ID) to identify the object the transponder is associated with. In order to form a response to the reader a pulse generator, modulator and a pseudo-random code generator are used. The modulator performs pulse position modulation or bi-phase modulation. The PR code generator is used to provide time-hopping or direct spreading multiple access technique well known in prior art.

According to a preferred embodiment a delay line (DL) and a summator provide compression of input power pulse signals. In addition, the delay line (DL) transfers the input signal from the first tap to a detector at a chip. The input signal can also be transferred from any tap of DL to the detector.

Figure 3B:
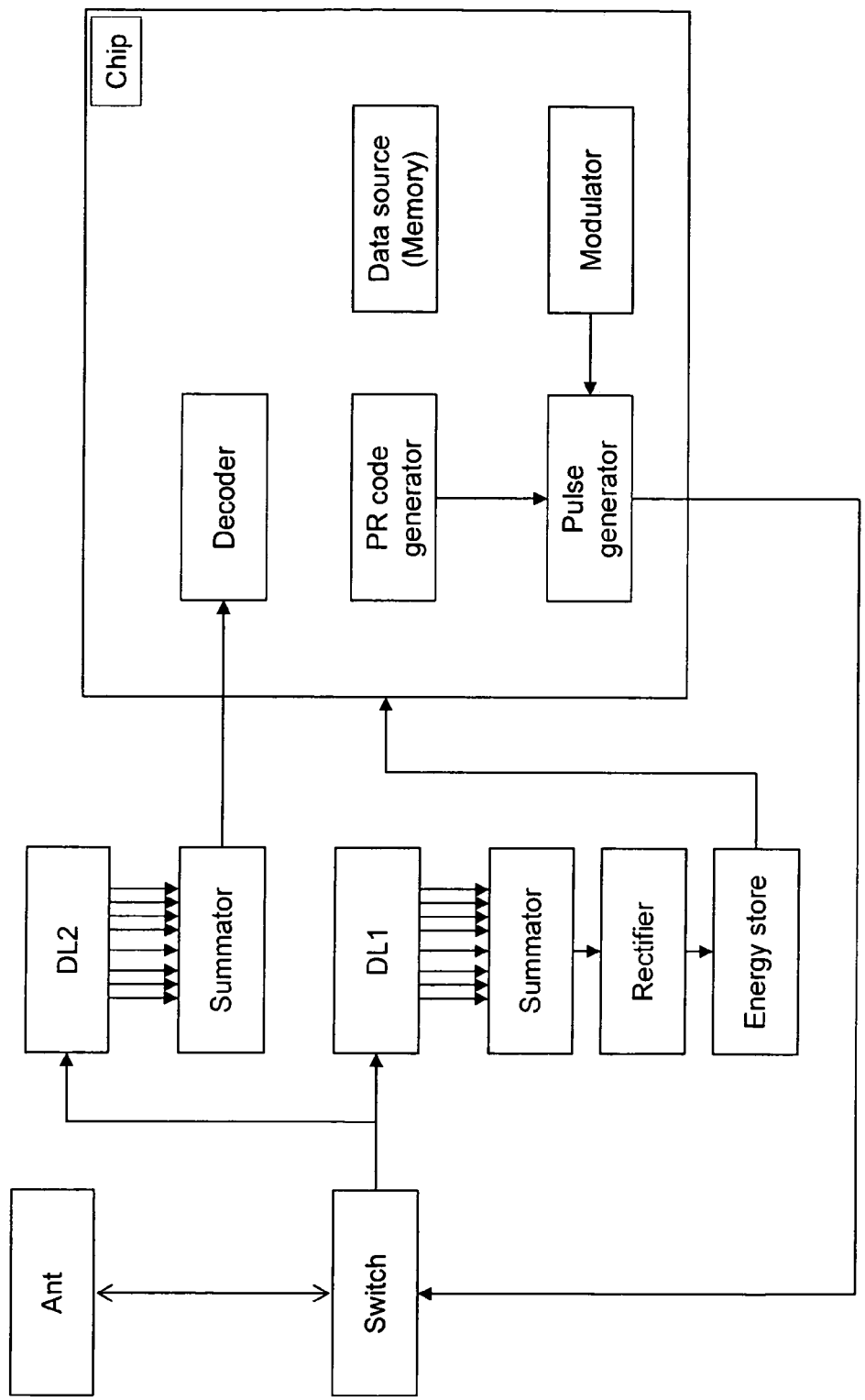
FIG. 3b is a diagram of a carrierless (impulse) RFID tag having two delay lines (DL1 and DL2)

According to another embodiment a second delay line (DL2) is used as a matching filter for detecting input data signals as illustrated in FIG. 3b. An advantage of having two delay lines is that the second delay line DL2 detects a data signal and eliminates the need for a detector in the chip. In addition, use of a second delay line allows relatively long both power and data codes.

Figure 4:
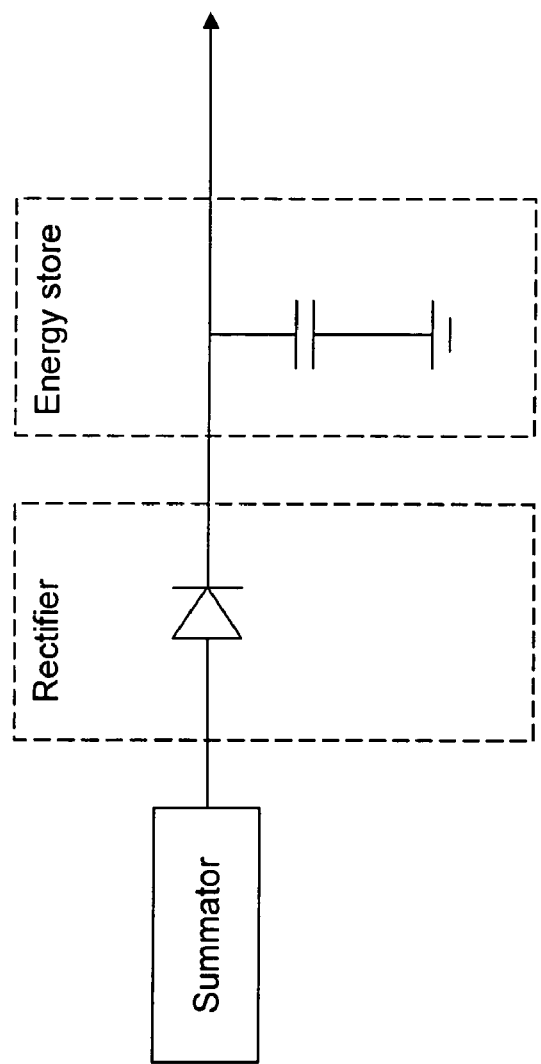
FIG. 4 is an illustration of a power supply.

FIG. 4 illustrates the power supply which comprises a summator, a rectifier and an energy store. In order to use the power signal from the summator as effectively as possible a Schottky detector is used as a rectifier as shown in FIG. 4. To increase the output voltage, a voltage multiplier circuit may be used in the rectifier.

Figure 5:
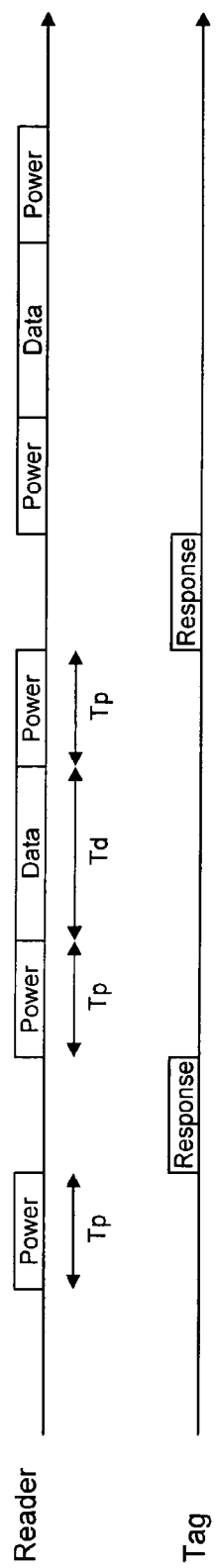
FIG. 5 illustrates a preferred structure of communication link between a reader and a tag. The horizontal axis represents time.

FIG. 5 illustrates one of two structures of communication link between a reader and a tag. Primarily, the reader transmits a set of repeated power pulse sequences of total duration Tp. A voltage rectifying circuit (Schottky detector) provides power to an energy store. During the energy store charging process the chip is in stand-by or power saving/off mode, which means that there is no or almost no power consumption. When the charging capacitor is fully charged (that depends on selected duration Tp) the chip starts to operate and the tag responds. The voltage supplied by the energy store needs to be equal or higher than the minimum chip operating voltage.

Still referring to FIG. 5, upon receiving the tag's response the reader may send some data to the tag. In order to do that the reader transmits the pulse sequences as follows:
 a set of coded power pulse sequences of duration Tp;
 a set of coded data pulse sequences of duration Td;

a set of coded power pulse sequences of duration Tp, and so forth.

Figure 6:
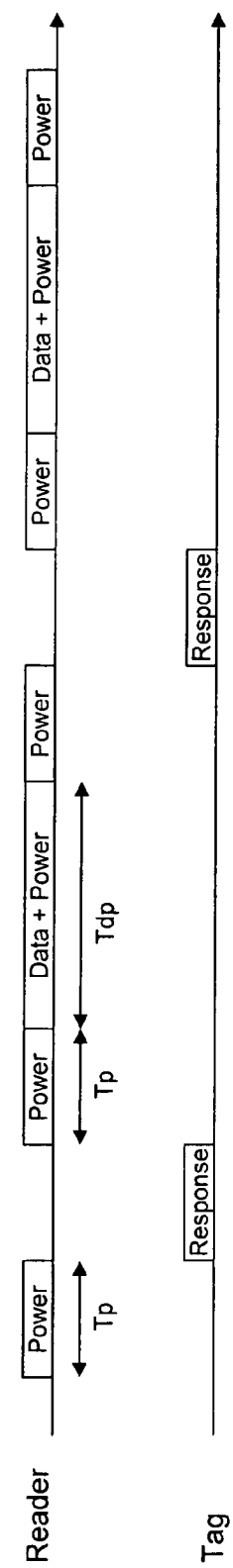
FIG. 6 illustrates another preferred structure of communication link between a reader and a tag. The horizontal axis represents time.
Figure 7:
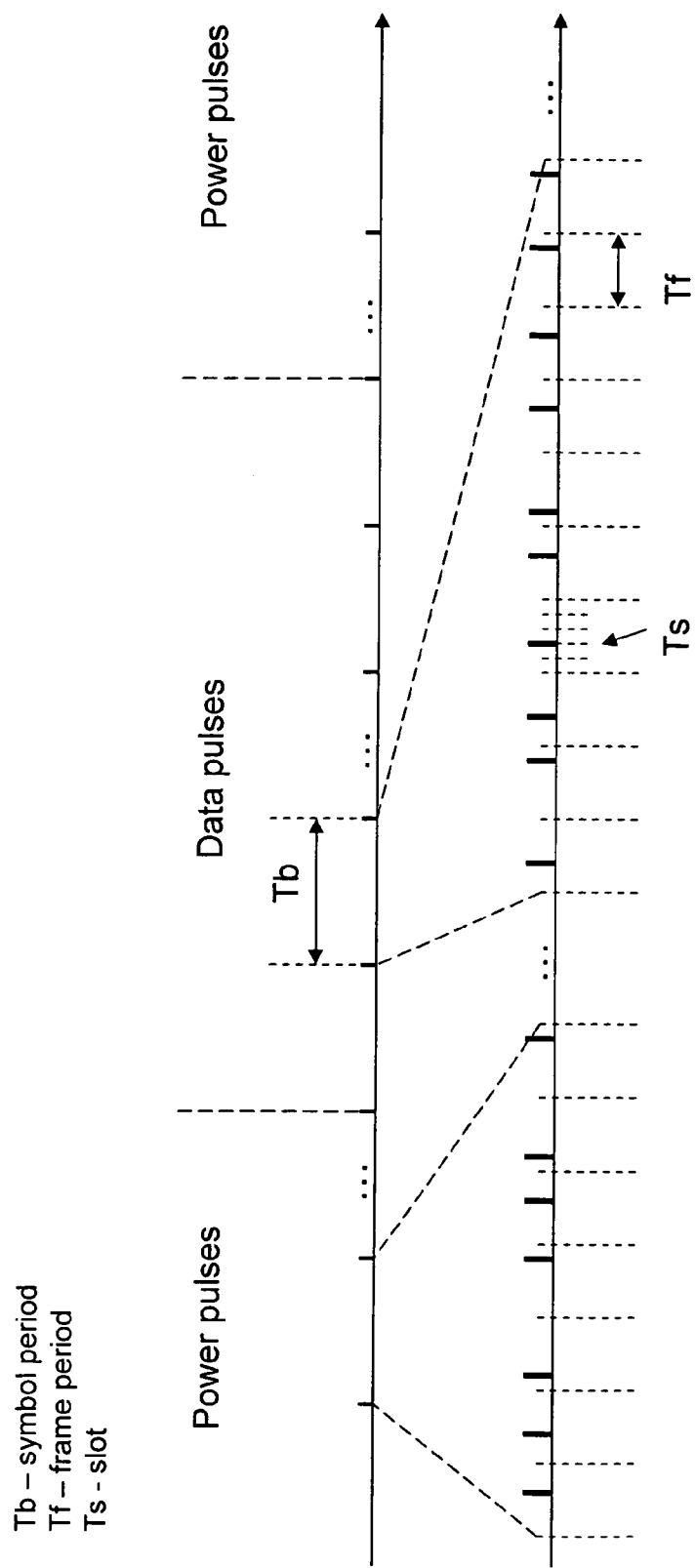
FIG. 7 illustrates a reader's signal structure of the link shown in FIG. 5.
Figure 8:
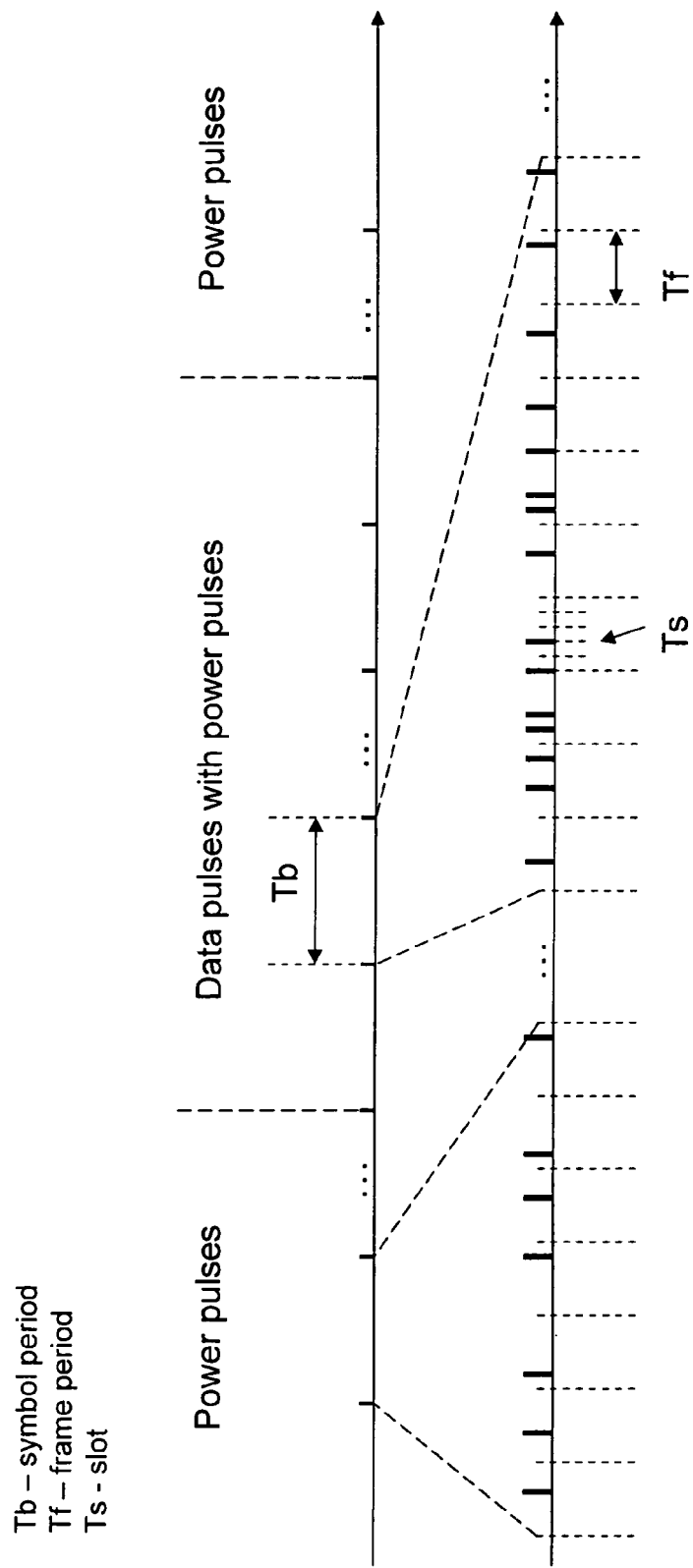
FIG. 8 illustrates a reader's signal structure of the link shown in FIG. 6.

FIG. 6 shows the second link structure which differs from the first one by combining the data pulse sequences and the power pulse sequences into the signal of duration Tdp. According to this embodiment, power pulse sequences are embedded into the data pulse signal and the chip is permanently in operating mode. In combined data and power pulse signal, power pulse and data pulse may be positioned within one frame as well as be coinciding. FIG. 7 and FIG. 8 illustrate reader's signal structures for the embodiments illustrated in FIGS. 5 and 6 respectively.

Another embodiment of the instant invention is an application of the carrierless RFID method apart from the radio identification of objects: transferring biosensor signals, for example, cardiac signals. According to this embodiment, no wires are required for transferring the signals from the sensors to registering equipment. Inherent properties of carrierless method eliminate the effect of induced noise. Moreover, advantage is that the embodiment of the instant invention allows reading biosensor data and processing it simultaneously. The traditional RFID systems only allow successive receiving and processing the signals due to anti-collision procedures.

Figure 9:
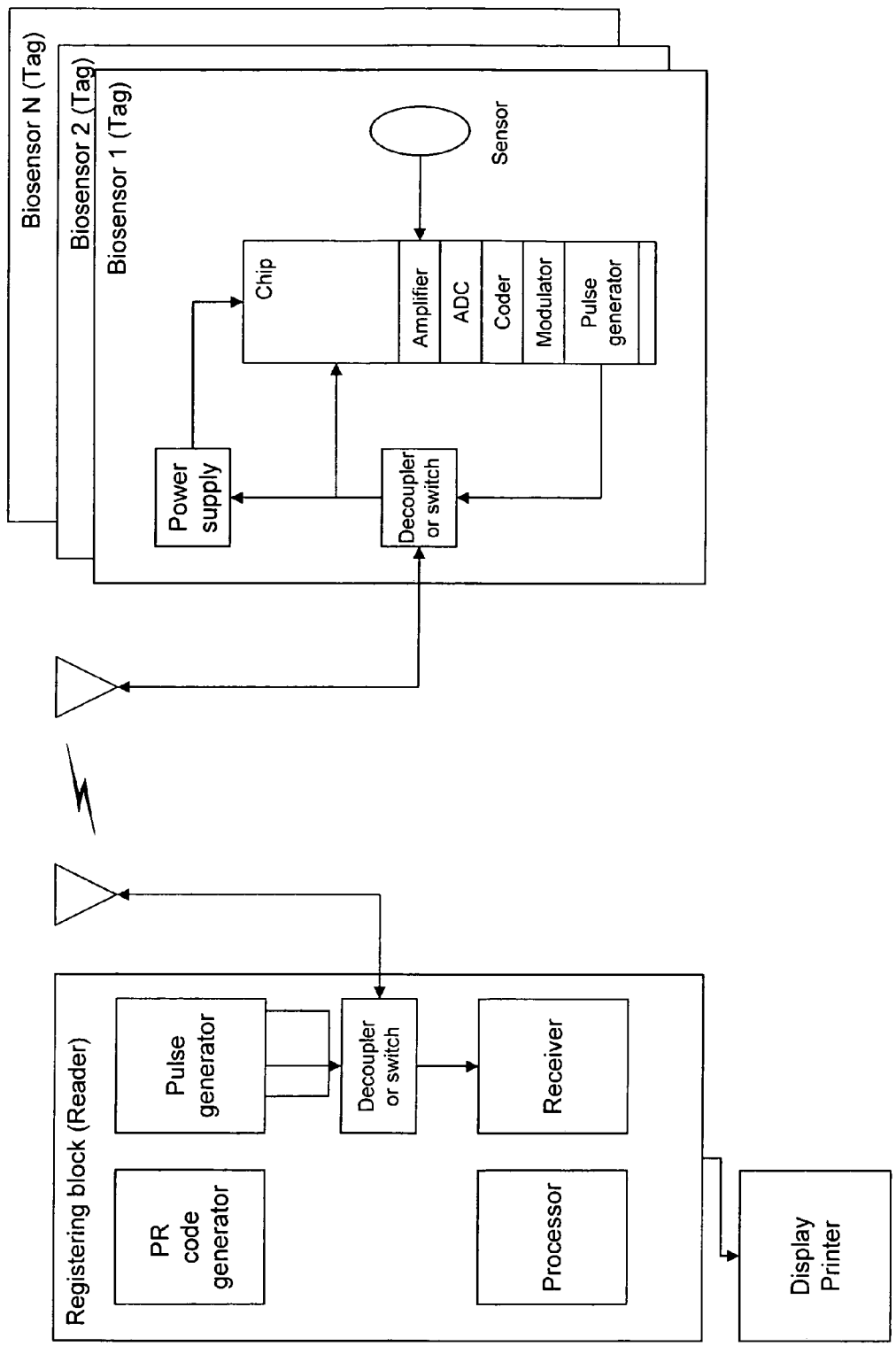
FIG. 9. illustrates an RFID-based N-channel cardiograph.
Figure 10:
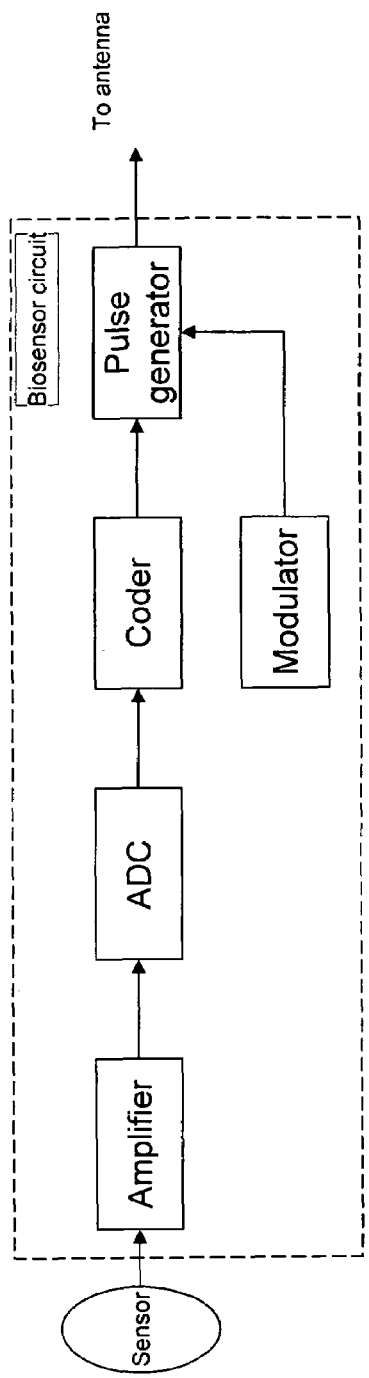
FIG. 10. is a block diagram of the transceiver of the biosensor of FIG. 9.

The embodiment is shown in FIG. 9 where the impulse RFID-based N-channel cardiograph consists of a registering block and a number of biosensors. The registering block is the reader transfers power to the biosensors (tags). The biosensors are energized by the reader's pulses as described above. The energized biosensors then read the cardiac signals and send them to the registering block. The biosensor's chip includes a transceiver as illustrated in details in FIG. 10. Since the cardiac signals are essentially of low frequency the sampling rate of an ADC is also selected to be low. This allows energizing the biosensor chip according to the invention. The biosensors can be passive (no battery) or have a chargeable battery.

Figure 11:
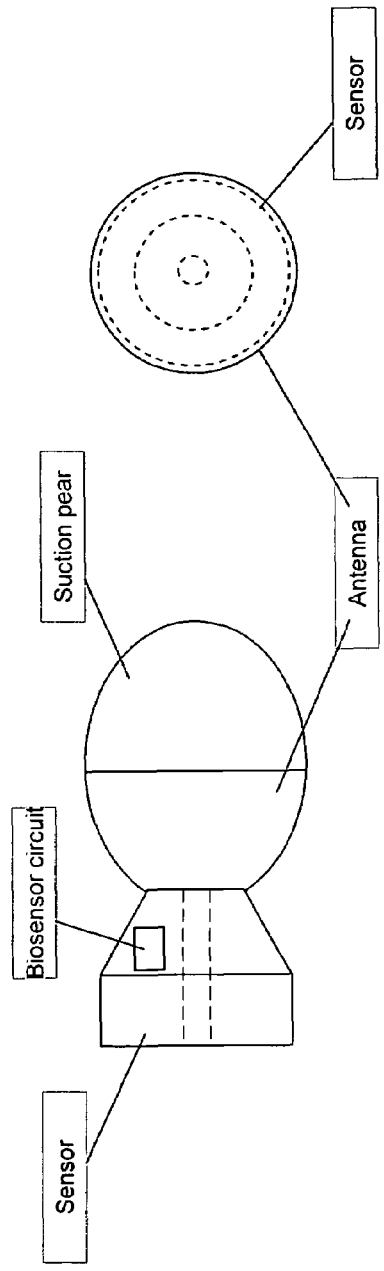
FIG. 11. illustrates a cardio suction electrode with a biosensor and an antenna.

FIG. 11 shows a cardio suction electrode with the biosensor and the antenna. The electrode structure is very suitable for mounting the ultra wideband horn-type antenna.

What is claimed is:

1. A method for energizing remote transponders and communication, said method comprising the steps of:
    a) a reader generating and transmitting coded sequences of short high power pulses repeatedly through a reader antenna;
    b) at least one transponder matching with coded power pulse sequence and receiving the high power pulses via a transponder antenna, said transponder further comprising a power supply and a chip, said chip comprising a detector, a decoder, a data source, a modulator, a pseudo random generator and a pulse generator;
    c) said transponder antenna introducing the pulses to said power supply containing a delay line, a summator, a rectifier and an energy store;
    d) said energy store becoming charged and said energy store feeding said chip;
    e) said detector and decoder of said chip further processing the signals;
    f) said data source, modulator, pseudo random generator and pulse generator forming a response to the reader;
    g) said reader receiving the response and sending coded data pulse sequences to the transponder, said coded data pulse sequences being either separate from the coded power pulse sequences or being embedded into the coded power pulse sequences; and
    h) said power pulse sequences and data pulse sequences being modulated with pulse position modulation or bi-phase modulation.

2. The method according to claim 1, wherein the transponder is an active transponder.

3. The method according to claim 1, wherein the transponder is a passive transponder.

4. The method according to claim 1, wherein the reader is a registering block of a cardiograph and the transponder is a biosensor of the cardiograph.

5. A method for carrierless communication between a reader and at least one transponder, said method comprising the steps of:
    a) a reader comprising a pseudo random code generator and a pulse generator generating and transmitting coded sequences of short high power pulses repeatedly through a reader antenna;
    b) said reader generating and transmitting coded data pulse sequences, and said coded data pulse sequences being either separate from the power pulse sequences or being embedded into the power pulse sequences;
    c) at least one transponder associated with an object and matching with the power pulse sequence receiving the high power pulses via a transponder antenna, said transponder further comprising at least one delay line, a summator, a rectifier, an energy store and a chip, said chip comprising a detector, a decoder, a data source, a modulator, a pseudo random generator and a pulse generator;
    d) said data source providing a specific binary sequence as an identifier to identify the object;
    e) said transponder antenna introducing the pulses to a delay line;
    f) said delay line feeding the pulses to a summator and transferring an input signal to the detector in the chip,
    g) said summator compressing the pulse signal and feeding the compressed pulse signals to a rectifier;
    h) said rectifier feeding the pulse signal to an energy store;
    i) said energy store becoming energized and further feeding said chip;
    j) said detector feeding the input signal to a decoder and said decoder further processing the signal;
    k) said modulator performing pulse position modulation or bi-phase modulation and said pseudo random code generator providing time hopping or direct spreading; and
    l) said pulse generator sending a response through the transponder antenna to the reader.

6. The method according to claim 5, wherein the power pulse sequences are different for each transponder or a group of transponders.

7. The method according to claim 5, wherein the detector is a Schottky detector.

8. The method according to claim 5, wherein the transponder is an active transponder.

9. The method according to claim 5, wherein the transponder is a passive transponder.

10. The method according to claim 5, wherein the transponder comprises a first and a second delay line and a first and a second summator,
    said first delay line feeding the pulses through the first summator and a rectifier further feeding compressed pulses to the energy store and said energy store becoming charged and further feeding the chip; and
    the second delay line feeding the pulses to the second summator, said second summator feeding compressed pulses to the decoder.

11. The method according to claim 10 wherein coded data pulse sequences are either separated from the power pulse sequences or embedded into the power pulse sequences.

12. The method according to claim 10, wherein the power pulse sequences are different for each transponder or a group of transponders.

13. The method according to claim 10, wherein the diode detector is a Schottky detector.

14. The method according to claim 10, wherein the transponder is an active transponder.

15. The method according to claim 10 wherein the transponder is a passive transponder.

16. An apparatus for energizing remote transponders and communication according to the method of claim 1, wherein the apparatus comprises a reader and a transponder;
   said reader comprising a pulse generator, a pseudo random code generator, a processor, a receiver and an antenna;
      said pseudo random generator and pulse generator generating coded sequences of short high power pulses repeatedly and transmitting them through the antenna to the transponder;
      said pseudo random code generator and pulse generator generating and transmitting coded sequences of data pulses through the antenna to the transponder, said coded sequences of data pulses being separate of the coded sequences of power pulses or being embedded into the coded sequences of power pulses;
      said processor using for modulating the transmitting signals;
      said receiver using for detecting and decoding received signals and
   said transponder comprising a transponder antenna, a power supply and a chip, said transponder antenna introducing the pulses to said power supply, comprising a rectifier and an energy store and said energy store becoming energized from the energy of the high power pulses and further feeding the chip, said chip comprising a detector to detect the pulse sequences received by the antenna, a decoder to decode the pulse sequences, a data source, a modulator, a pseudo random generator and pulse generator to send a response to the reader.

17. A communication link structure between a reader and a transponder, said link structure comprising:
   repeated power pulse signals transmitted by the reader to the transponder,
   said transponder further comprising a chip and a power supply with an energy store,
   said energy store becoming energized by the energy of the pulse signals and the chip being in a stand by or power saving/off mode during the charging the energy store;
   said chip beginning to operate when the energy store is fully energized and the transponder responding to the reader;
   said reader further sending data to the transponder after receiving the response of the transponder, said data being in form of data pulses, said data pulses further being separate pulses or being embedded into the power pulses;
   said chip operating permanently in the case of data pulses embedded into the power pulses.

* * * * *